(12) United States Patent  
Head et al.

(10) Patent No.: US 7,458,689 B2  
(45) Date of Patent: Dec. 2, 2008

(54) CAMOUFLAGED DISPLAY STAND

(76) Inventors: Gene Head, 9829 Mohr's Cove, Windermere, FL (US) 34786; Marco Lin, 14104 Arbor Pl., Cerritos, CA (US) 90703

( * ) Notice: Subject to any disclaimer, the term of this patent is extended or adjusted under 35 U.S.C. 154(b) by 491 days.

(21) Appl. No.: 11/371,799

(22) Filed: Mar. 9, 2006

(65) Prior Publication Data

US 2007/0211181 A1    Sep. 13, 2007

(51) Int. Cl.
*G03B 21/14* (2006.01)
*H04N 5/64* (2006.01)

(52) U.S. Cl. ............... 353/74; 348/836; 348/841; 248/917; 248/918; 312/312

(58) Field of Classification Search .......... 353/74, 353/77, 78; 348/836, 839, 841, 842, 843; 248/917, 918
See application file for complete search history.

(56) References Cited

U.S. PATENT DOCUMENTS

| | | | | |
|---|---|---|---|---|
| 5,148,283 A | * | 9/1992 | Taddeo | 348/832 |
| 6,831,829 B2 | * | 12/2004 | Einhorn et al. | 361/681 |
| 6,988,339 B2 | * | 1/2006 | Pylkki et al. | 52/173.3 |
| 2005/0133231 A1 | * | 6/2005 | Conerton | 174/17 VA |
| 2006/0076860 A1 | * | 4/2006 | Hoss | 312/312 |
| 2006/0261714 A1 | * | 11/2006 | Hazzard | 312/319.8 |
| 2007/0240347 A1 | * | 10/2007 | Chang | 40/601 |
| 2008/0088212 A1 | * | 4/2008 | Annas | 312/203 |

* cited by examiner

*Primary Examiner*—William C. Dowling
(74) *Attorney, Agent, or Firm*—Lisa A. Karczewski; Chan Law Group LLP

(57) ABSTRACT

A display stand is camouflaged as ordinary furniture, such as a dresser with mirror combination for the bedroom or as an armoire. The stand conceals another object, such as a television display, when one doesn't wish to observe that object, but otherwise exposes the object to view. Supported in a stationary position at least a vertically positionable opaque mirror or panel located directly in front of the television display when the television is not in use prevents the display from being viewed. The mirror or panel is supported by an electric elevator platform or lift inside the furniture, which, at the viewers option, is selectively vertically moved by the lift to a full up position that blocks a view of the stationary object or to a full down position inside the dresser that uncovers the object.

22 Claims, 4 Drawing Sheets

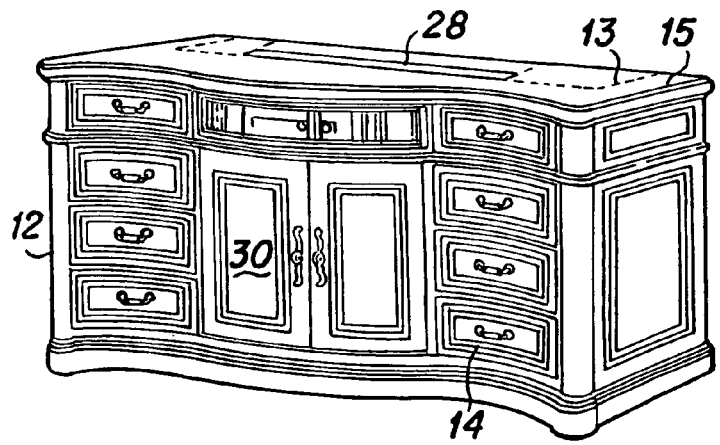
Fig.3
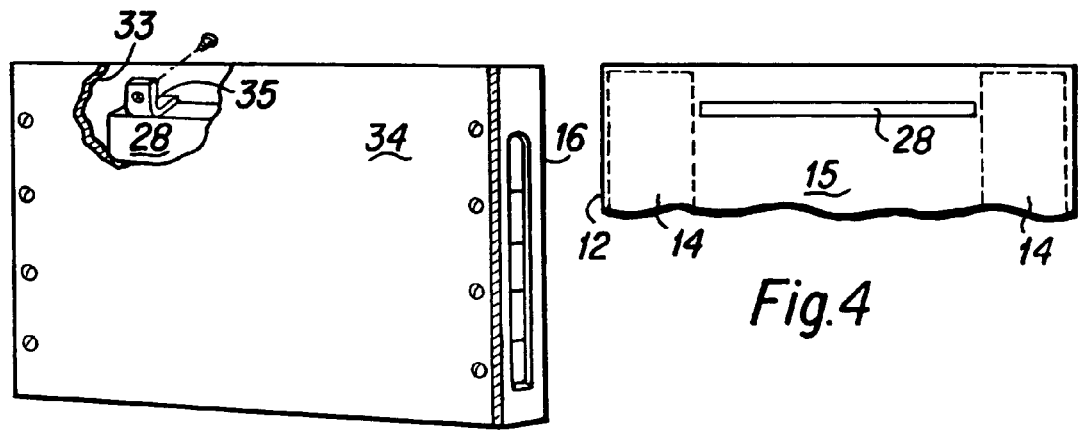
Fig.4
Fig.5
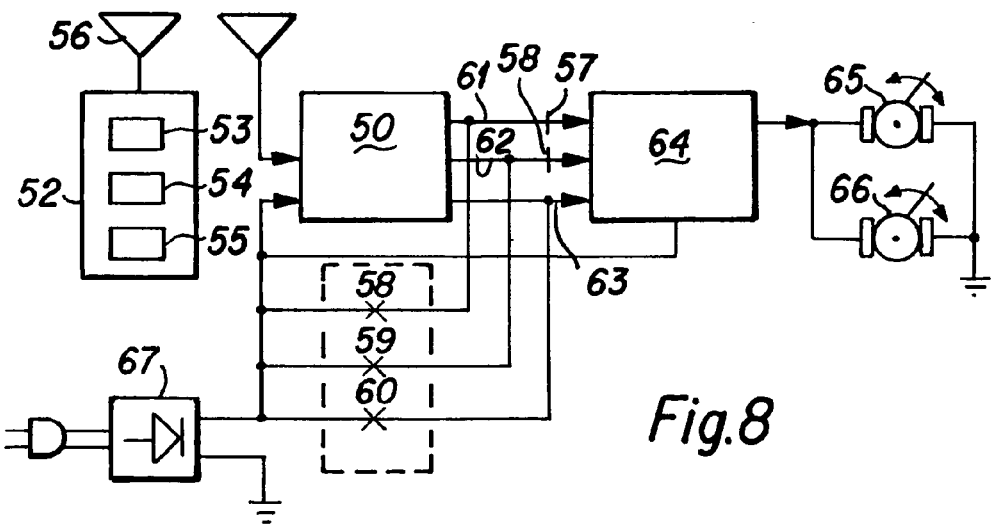
Fig.8

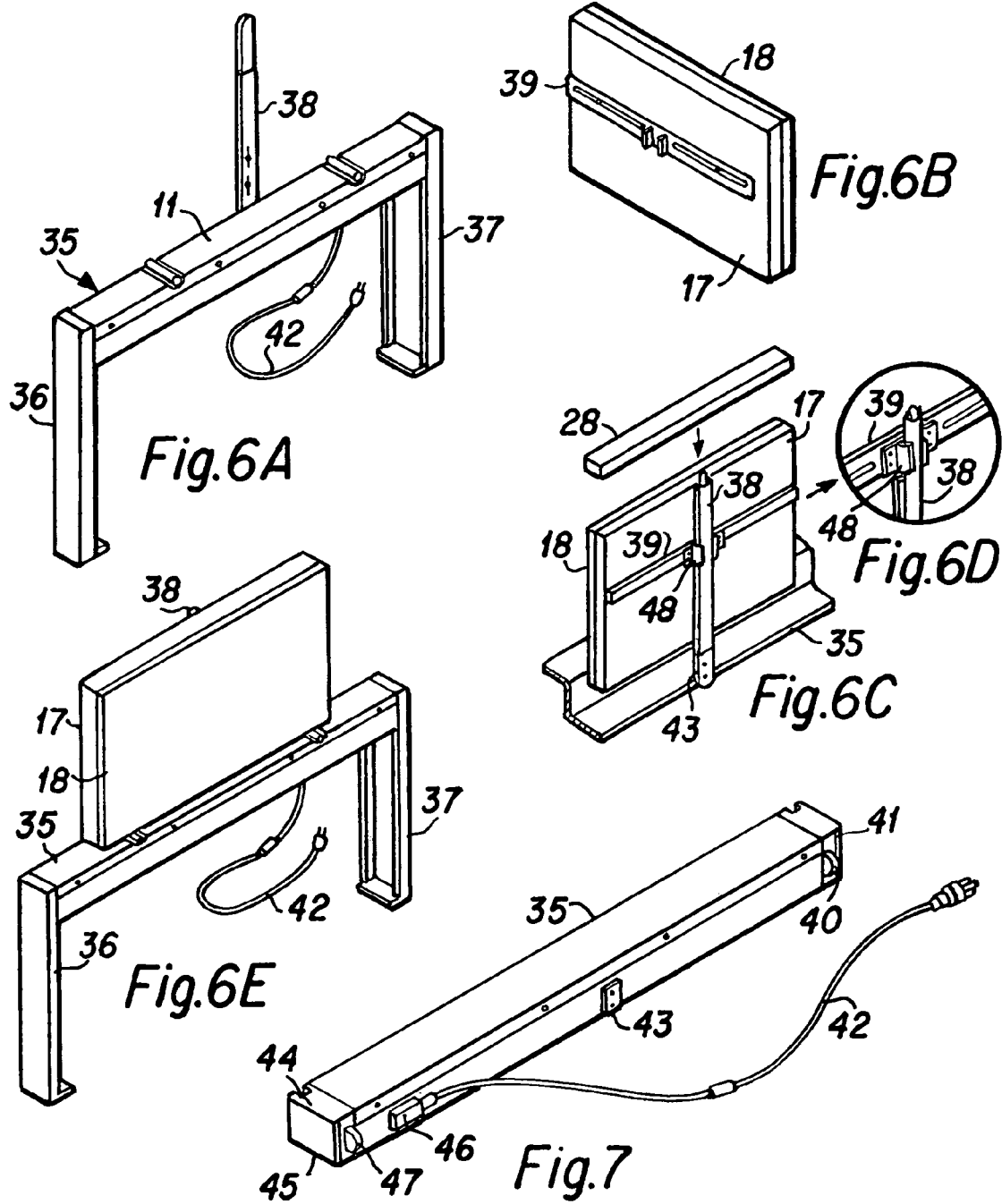

CAMOUFLAGED DISPLAY STAND

FIELD OF THE INVENTION

This invention generally relates to furniture that, in addition to the normal function of storing clothing, serves as a stand for display of a television set or other object, and, more particularly, to a dresser-television combination that presents the appearance and function of a dresser or other receptacle for clothing articles, but also supports and conceals another article, when not intended to be viewed, that some regard as unsightly, such as a flat screen plasma television display, LCD television display or other article.

BACKGROUND

Television programs are a major source of entertainment, news and education for consumers. Coupled with the ever declining price of television receivers (also known as television sets or often more simply referred to as televisions) and improving reliability and quality, the television has become ubiquitous, particularly around the home. Many homeowners have television sets in two or three rooms of their home. One prime placement is the homeowner's bedroom, where the homeowner may recline in comfort, be entertained by a television program, and be lulled to sleep by that media.

The television may be supported by a special bracket to a wall stud, on an audio-visual rack located in the bedroom or placed atop the bedroom dresser. Rarely does one have enough space to mount a free-standing large diameter cathode ray tube type television in one's bedroom. That type of television is quite large in size. The newer technology flat screen televisions, such as the plasma TV's and the LCD TV's are touted as space savers, televisions that can be mounted flat against the wall or even be hung from the wall. In many homes of a married couple one of the two spouses becomes the self-appointed arbiter of decorative tastefulness. What represents pleasing technology to one, often represents undesirable unsightly mind-numbing clutter to the other. The latter person doesn't want to see a television in the bedroom.

Rather than provoke conflict, a possible cure for the problem was provided in the past by storing (or hiding) the television behind closed doors in a cabinet, referred to as an armoire. The doors present to view panels of attractively finished wood while preventing one from viewing the confined television, effectively hiding the television. Overall, the armoire typically is a fine looking piece of tall furniture with doors, drawers and shelves and is a familiar sight to business travelers who stay as guests in the finer hotels of major cities. Not only does that piece of furniture contain a cabinet for the TV at an appropriate height for viewing, but located beneath the TV cabinet the armoire also contains a number of dresser drawers in which clothing and like articles may be stored. When one wants to watch a television program, the doors of the armoire are swung open exposing the television panel display to view. Otherwise, the armoire doors are closed and the television set remains out of sight and out of mind.

However, existing armoires are somewhat large and take up a considerable amount of space in a room. Designed for the bulky cathode ray tube type television receivers, the Armoire is too much for newer technology flat-screen television receivers, such as those containing the plasma type and liquid crystal type ("LCD") displays.

At this point in the description, some clarification of the technology may avoid possible confusion. As used herein the term "flat screen display" or "flat screen television" refers to the plasma televisions and the LCD televisions, which are presently about four inches thick. The term does not refer to and excludes the cathode ray tube ("CRT") type televisions, even though the surface of the front side of some CRT's are flat and even though some sellers in print advertising may refer to the display of a CRT type television that the retailer is using as a loss leader as a flat screen picture tube or display. In the latter, the CRT and, hence, the set is bulky in comparison to the picture-frame like geometry of plasma and LCD displays.

One obvious solution to the bulkiness of the armoire is to support the flat screen TV onto a movable platform or lift, referred to as a television lift, and integrates the movable TV into the furniture or into the wall. Such platforms or lifts are available from a number of sources including a company in China, which manufactures the model KF5004E lift used in the embodiment of the invention described herein, Zongkers Custom Furniture, Inc. of Omaha, Nebr., Cabinet Tronix of San Diego, Calif., and Auton Motorized Systems of Valencia, Calif., among others, which are advertised on the Internet. Thus, some furniture manufacturers, such as the foregoing manufacturers, may design or make available a piece of high quality furniture to incorporate a television elevator or, as variously termed, lift on which to install a flat screen television. Those lifts are typically operated by remote control using a hand held wireless (infra-red) controller, distinct from the remote control belonging to the television, and also include a manual switch, that is used as an alternate control should the remote control fail. The television is concealed inside a vertical channel or cavity inside the furniture. When the up button of the remote control is pressed, the television pops up, rises up from the cavity in the furniture and locks in place when the limit position is attained. The screen of the TV is exposed for viewing. When the down button of the controller is pressed, the television slowly descends back into the furniture. The top or cover section of the platform is a piece of the wood of the furniture. When the television reaches the lower position, concealed in the lower portion of the dresser (or other furniture), the top of the wood platform is flush with (and visually merges into) the remainder of the top surface of the furniture.

The foregoing arrangement may satisfy a spouse who is clutter-critical by keeping the flat-screen television out of sight when not in use. However, the plasma televisions are quite heavy. Although the television lifts are advertised as being capable of moving 120 pounds, which is considerably greater than the weight of presently known plasma televisions, the lifts are operated with gears, and gears eventually wear and may fail. Should the gears break, the lift may descend rapidly and strike the bottom, subjecting the television set to a large shock sufficient to damage the television. To prevent such an event requires diligent preventive maintenance, such as frequent inspection of the gears. Most persons, however, would prefer to "set it up and forget it," forgetting to carry out that maintenance. It is desirable to reduce stress on the lift, if possible, because a reduction in stress adds to the reliability and lifetime of the lift.

Further, installation of the television on the lift is not very easy. The procedure becomes problematic if the television is accidentally dropped during installation. Ideally, to avoid that possibility, handling of the television should be minimized. Moreover, nothing is ever permanent. Should one wish to upgrade to a newer larger size plasma TV to replace one that's earlier been installed or simply to replace a plasma TV that's failed, one must proceed through the installation process again with the attendant risks.

Accordingly, an object of the present invention is to camouflage a display stand as another product, such as a bedroom mirrored dresser to prevent a valuable or an unsightly article from being seen when not in use.

A further object of the invention is to conceal a television when not in use.

A still further object of the invention is concealment of a flat screen television or other article inside bedroom or living room furniture, such as a dresser and mirror combination, referred to herein as a mirrored dresser, or an armoire, when the TV is not in use.

An additional object of the invention is to conceal a television when not in use, particularly a plasma TV, while maintaining the television stationary in position on furniture.

And a still additional object of the invention is to ease the installation of and/or replacement of a plasma TV in a mirrored dresser camouflaged television stand.

SUMMARY OF THE INVENTION

In accordance with the foregoing objects a display stand for an article, such as a flat screen television, is camouflaged as useful furniture, such as a dresser with mirror or armoire that stores clothing. The flat screen television, such as a plasma or liquid crystal television, is stationary in position inside the upper portion of the furniture and is concealed by a vertically movable opaque panel, such as a mirror or a panel, at the front when the television is not in use. The opaque panel is movably supported by an electric elevator or lift and is selectively vertically moved by the electric lift on command selected by the TV user to a full up position that blocks the view of the television or a full down position inside the dresser that exposes the television to view. Moving the mirror or other opaque panel instead of the plasma TV, installation of the TV is simple and operation is believed to be more reliable.

The foregoing and additional objects and advantages of the invention, together with the structure characteristic thereof, which were only briefly summarized in the foregoing passages, will become more apparent to those skilled in the art upon reading the detailed description of a preferred embodiment of the invention, which follows in this specification, taken together with the illustrations thereof presented in the accompanying drawings.

BRIEF DESCRIPTION OF THE DRAWINGS

In the drawings:

FIG. 3 shows a the bottom portion of the embodiment of FIG. 1 with the upper hutch section removed;

FIG. 4 shows the base section shown in FIG. 3 in a top plan view;

FIG. 5 is a rear view of the hutch and plasma TV mounting board;

FIGS. 6A through 6E show an available (e.g. prior art) electrical lift for a plasma TV that serves as an element of the present invention to instead lift a mirror and the means by which the mirror is attached to the electrical lift;

FIG. 7 illustrates one of the elements of the electric lift of FIG. 6A to a larger scale;

FIG. 8 is an electric schematic of control circuits for the electric lift of FIGS. 6 and 7

DESCRIPTION OF THE PREFERRED EMBODIMENTS

Figure 1:
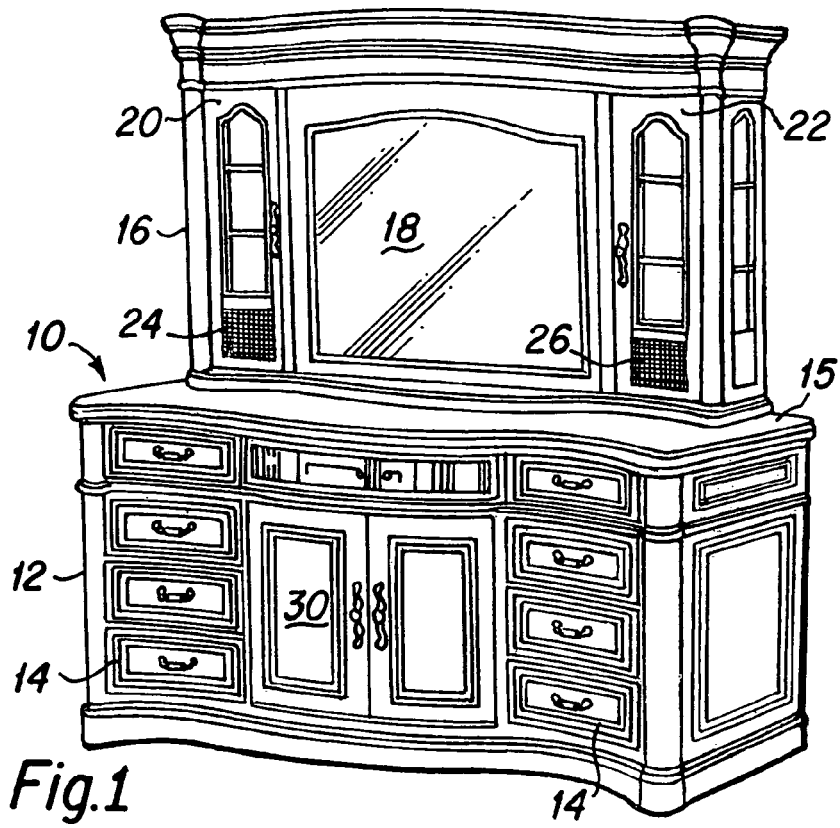
FIG. 1 is a front perspective of an embodiment of the invention.

The bedroom furniture 10 presented in FIG. 1 contains two parts, a lower or base section 12 that contains a number of drawers, such as drawer 14, and the upper or hutch section 16 that contains at least a mirror 18. The drawers 14 are fully operational; and are typically used to store clothing and/or other articles. Upper section 16 is attached to the top surface 15 of the base section 12, suitably by large bolts, not illustrated. In outward appearance the mirrored dresser of FIG. 1 appears as an ordinary mirrored dresser without revealing the added function of serving as a television stand. The hutch contains left 20 and right 22 glass-windowed hinged doors that may be swung open to provide access to a plurality of vertically spaced glass shelves on which one can store "knickknacks," a very conventional structure. The lower portion of doors 20 and 22 contain screened panels, 24 and 26, one in the left side door and the other on the right side. Each panel respectively conceals an audio loudspeaker. Mirror 18 is a "pop-up" or "pop down" mirror. That is, the mirror is vertically positionable and can be moved vertically downward into lower section 12 of the dresser. As becomes apparent later in this specification, the mirrored dresser supports and hides from view a plasma television that is normally obscured from being viewed from the front side of the dresser (e.g. is not visible from the front side of the dresser).

Figure 2:
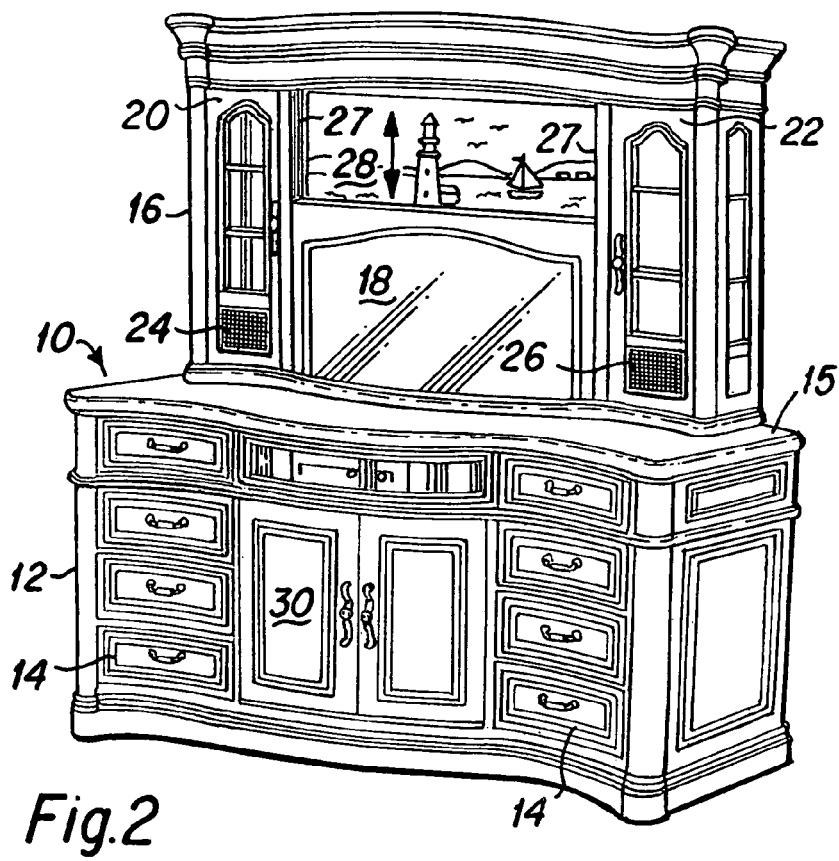
FIG. 2 shows the embodiment of FIG. 1 in a slightly different position.

The position of mirror 18 in mirrored dresser 10 is in transition, the process of change from one stage to another as shown in FIG. 2, to which reference is made. Responding to a command from an associated remote controller, not illustrated in the figure, operated by the homeowner, as example, the mirror 18 is in the process of being lowered into lower section 12, revealing a plasma TV display 28 located immediately behind mirror 18 in hutch 16 (and also exposes some small portion of the support for the plasma TV, latter herein more fully described). The plasma TV is remotely controlled using an infra-red hand held remote control, not illustrated, which is known in the television industry. The remote control is operated by the user, as example, to turn the power on to the television, change the volume, change the channels and so on. The plasma TV is mounted to hutch 16 and remains stationary in position, whereas mirror 18 is vertically movable, positionable. That is, the mirror is moved to a vertically "up" position that entirely fills the formed window opening in hutch 16, the upper limit, or is moved downwardly out of the formed "window" in the hutch and into the recess in the base section 12 of the dresser. That change exposes the entire surface of the television display 28. Mirror 18 is mounted atop a conventional remote-controlled electrical TV elevator platform or lift earlier referred to in the background to this invention, later herein-described in greater detail. Hutch 16 contains guide rails or channels 27 on the right and left sides of the formed window to guide the travel of the mirror as the mirror is vertically moved.

Reference is next made to FIG. 3, which is a front perspective of the base section 12 of the dresser prior to installation of hutch 16. Dash lines 13 on top surface 15 indicate the position of the hutch on the lower section 12 of the dresser. In this view the mirror is in the lowered position and fits inside the channel or cavity formed in the base section 12. The channel is rectangular in shape, culminates in a slot-like shaped opening in the top surface 15 positioned at the front side of the hutch. That channel is defined in great part by the width and thickness of mirror 18. In the preferred embodiment, the upper end edge 28 of mirror 18 is flat and formed of a wood that matches the wood of the flat top surface 15 of the lower section 12.

That upper edge is positioned flush with the top surface of the base section and fills the slot-like end of the channel when the mirror is in the down position. Alternatively, because the channel is inside the hutch window and thereby somewhat obscured from view, the top edge of the mirror need not entirely fill the slot-like channel opening in top surface 15, but may leave a gap or opening along side the mirror.

The foregoing relationship may be more easily understood from the top plan view of the base section 12 of the dresser presented in FIG. 4 to which reference is made. The drawers 14 on the right and left side of the base are basically identical in size and geometry and are symmetrical in position. As represented by the dash lines in this view, the drawers are fully operational and the operation of those drawers does not conflict or interfere with the movement of the mirror 18.

Referring again to FIG. 3, the base section contains two large hinged doors 30 that may be swung open to reveal shelves that are slightly short in depth so as not to extend into the mirror cavity in the base. Two piers or glass doors 32 are located above doors 30 and provide closure to an accessory shelf in the base. This is the space provided to store any electronics equipment, such as tuners, amplifiers and the like for the operation of the plasma TV, if needed, or extra audio equipment.

FIG. 5 is a pictorial rear view of hutch 16 of FIG. 1 and the supplemental rear mounting wall 34 for plasma TV 28. As earlier viewed in FIGS. 1 and 2, the hutch is defined by a wooden frame. That frame contains a stud or frame member on the rear right side and rear left side. While sufficient as a mirrored dresser, some additional support is needed to mount the plasma TV to the hutch. Although many alternative structures come to mind, the preferred form is to mount a thick board that covers the entire backside of the hutch, forming a rigid wall. That board is attached to at least the right and left rear side frame members of the hutch, suitably with strong wood screws. That provides a strong support for the plasma TV display 28, and braces the entire hutch. Prior to attaching board 34 to the hutch, the plasma TV display is mounted to the front side of that board. As shown in the cutout portion 33 of the figure, flat-screen TV display 28 is attached at the four corners to board 34 by conventional mounting brackets 35, only one of which is illustrated. However, any suitable mounting brackets that are commercially available may be used.

Reference is next made to FIGS. 6A through 6E that illustrate the electrically operated elevator or lift for the mirror. Designed for lifting plasma Televisions, the lifts are entirely conventional in structure and easily adapted to lifting of mirrors for use in the present invention. FIG. 6A shows the platform 11 in the raised or "up" position prior to installation of the mirror 18. That platform contains the engine 35, which houses the control electronics and motors, not visible, for the electric lift, the side panels 36 and 37, which contains geared track, a support arm 38 and a power cord 42 to furnish house AC current to engine 35.

FIG. 6B is a rear view of mirror 18 and is shown with the wall plate 39 attached. Mirror 18 is a commercially available structure, as example, containing a clear layer of glass with a silvered layer backing. The mirror is attached to a panel 17, suitably formed of wood. The attachment or bond may be made with an adhesive or the like. The wall plate 39 easily attaches to the wooden panel with short screws. The panel 17, mirror 18 and wall plate 39 defines a mirror assembly. FIGS. 6C and 6D show the assembly of the wall plate 39 to support arm 38 with the support arm inserted through an attachment bracket 48. Support arm 38 is supported by the bracket 43 on the side panel of engine 35 as shown in FIG. 6C.

The elements are shown assembled in FIG. 6E to which reference is next made. As earlier described mirror 18 contains a reflective front surface, typically a layer of glass backed by a silvered layer, and the front surface is bonded to a panel of wood or other material to which the wall bracket 39 is attached. In other embodiments described herein the mirror and its image reflecting function may be eliminated and the wood panel may be directly exposed to view and block direct view of the television.

Engine 35 is reversed from the view of FIG. 6A and that reversed view is shown in an enlarged view in FIG. 7 to which reference is made. The mounting bracket 43 of the support arm and power cord 42 which were earlier described are visible in this view. Power cord 42 connects to the control box 46 that contains the controlling electronics. A platform gear 40 is included on the right of the engine and another 47 is included on the left in the figure. The gears engage a toothed track on the adjoining side panels 37 and 37 and are driven by small motors inside engine 35 to permit the engine to walk up the track or down. The engine also includes a guide plate 41, an upper limit switch 44 and a lower limit switch 45. Those limit switches respectively terminate current to the respective motors once the engine 35 attains the desired height during upward movement and when the engine attains the appropriate depth into the dresser during downward vertical movement.

Returning to FIG. 6E, the upper end of the side panels 36 and 37 supports the engine 35 when the unit is installed in the cavity in the mirrored dresser. Each side panel is attached to a side wall of the formed cavity in the dresser, while the engine is placed in between the side panels with the gears 40 and 41 engaging respective geared tracks in those panels. The rectangular (or rectanguloid) cavity formed in the mirrored dresser is made wide enough to accommodate the side panels. The height of that formed cavity and, hence, the distance between the bottom and top surface of the lower section 12 of dresser 10 must extend from the bottom of the side panels to the top of support arm 38 and the top edge of mirror 18. That ensures that the mirror, when lowered, is tucked away, out of sight. In FIG. 6D, support arm 38 is exaggerated in height for illustrative purposes, but, in fact, should not extend above the top edge of mirror 18 such as shown in FIG. 6C.

Basically the manufacturer of the foregoing kind of lift device provides complete assembly and test instructions, known information which need not be repeated in this specification. The lift is controlled by a user operated battery powered wireless controller, not illustrated in the foregoing figures, that includes three momentary operated switches, one to issue a command for the engine to move upward, a second to issue a command for the engine to move downward, and a third to immediately halt or stop operation of the engine. The controller may also include an LED indicator lamp to signal when a switch is operated by the user. The engine 35 includes a wireless receiver to receive and decode commands originating from the wireless controller, and appropriate electronic controller circuitry to carry out the operations commanded.

A plasma television when installed as well as any accompanying electronics requires power. For that a power cord, not illustrated, is threaded through the rear of the dresser for connection to the house electrical outlet. Likewise electrical leads may be threaded through the unit from an installed television or other equipment to the loudspeakers and/or from the other equipment to the television. As one appreciates, since the television does not move in position, the wires connected to the television to do need to flex or be moved back and forth, which increases the operational life of the wiring. A simplified electrical schematic of an electronic power and control circuit is illustrated in FIG. 8 to which reference is made.

A high frequency receiver-decoder 50 receives signals from a remote control 52, the latter of which is powered by batteries. The remote controller contains three momentary operate push button switches 53, 54 and 55, which are selected by the person to initiate respective signals to raise the mirror, lower the mirror and stop movement of the mirror. Operation of the switches is translated by logic circuits, not illustrated, inside the controller to cause the proper operation of the RF transmitter, also not illustrated, inside controller 52, which transmits the signal, as represented by antenna or emitter 56. Momentary operate switches 53-55 are duplicated by momentary operate switches, later herein discussed, located inside the dresser. Signals from controller 52 are received and the information in the signal detected by receiver detector 50. That unit outputs the appropriate one of the three outputs at 61, 62 and 63, respectively representing the commands to move the mirror up, the command to move the mirror down, and the command to halt vertical movement of the mirror. Those outputs are input to the respective inputs of motor control 64 which controls motors 65 and 66 in the engine of the electric lift. The foregoing control units are small in size and are located inside the engine compartment in the lift.

Power is supplied to the unit from the house supply, typically 120 volts AC, which is applied to a rectifier 67 that rectifies and down-converts the 120 volt AC to a lower voltage, such as 14 volts DC. One polarity of that DC voltage is fed to the power inputs of both the receiver 50 and motor controller 64 and the other polarity connects to circuit ground. If for any reason the remote control 52 fails, the user is able to access switches 58 through 60 inside the dresser. Those switches provide an alternate route to provide the appropriate control voltage to the input of motor controller 64. Break contacts 57 and 58 in the figure respectively represent the upper limit switch and the lower limit switch, earlier described in connection with the description of the engine of FIG. 7. When the mirror is moved vertically upward inside the hutch and the top edge of that mirror reaches the maximum permissible height for the mirror, limit switch 57 detects that limit and opens the circuit that supplies the "up" signal to controller 64 and the latter de-energizes the bidirectional motors 65 and 66. Likewise when the mirror is moved downward fully into the vertical channel in the dresser the bottom edge of the mirror or an edge of the electric lift attains a predetermined lower position and actuates the limit switch 58 cutting off the "down" signal to control 64 and the motors 65 and 66 are de-energized.

As those skilled in the art appreciate, the foregoing prior art control circuitry is but one of many available control circuits for electric TV lifts, and the particular control circuit selected doesn't appear to be critical.

The mirrored dresser is constructed of wood that is properly finished in the manner of fine furniture with metal hardware, such as brass hardware. Typically a plasma television displays (and liquid crystal televisions displays) are about four inches thick; a deck or top surface 15 is about ten inches wide, the dresser may be about sixty-six inches wide with the swinging doors 30 on the front of the lower section about ten inches wide, and the mirror 18 approximately forty-six inches wide. The back panel or board 34 is about sixty-six inches wide, and between three-quarters and one inch thick and is positioned approximately eight to nine inches behind mirror 18. The cavity for the lift 35 and mirror assembly is about nine inches deep. Preferably, the mirror should be framed.

Figure 9:
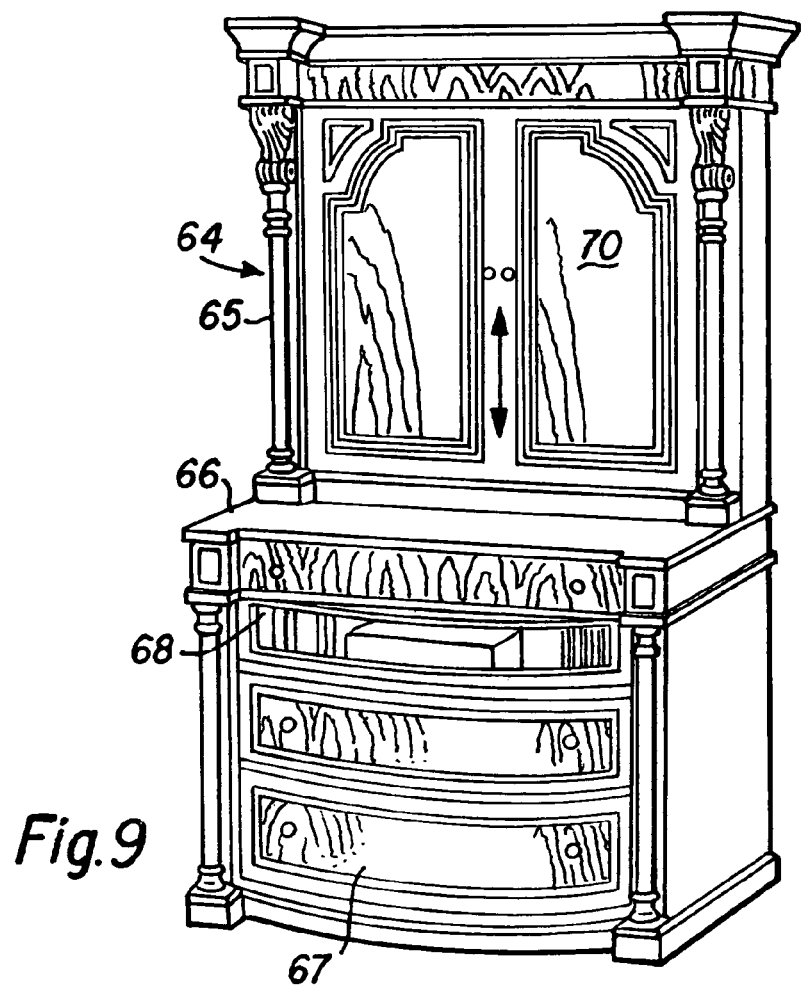
FIG. 9 is an armoire embodiment of the combination invention of FIG. 1.
Figure 10:
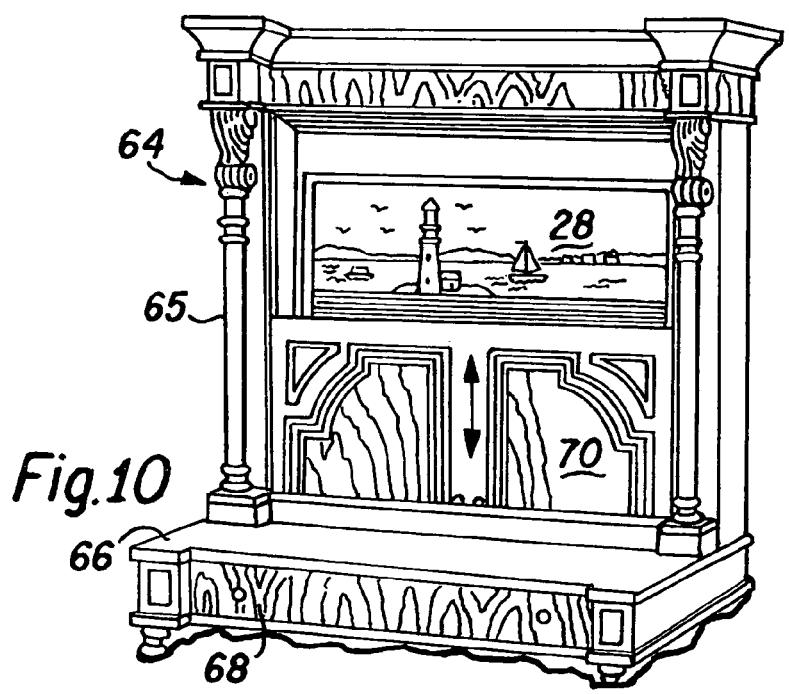
FIG. 10 is a partial illustration of the embodiment of FIG. 9 showing the embodiment in a transition state.

The image reflection function of the mirror is eliminated in another embodiment, which we refer to as the armoire embodiment 48, such as illustrated in FIGS. 9 and 10, which are next considered. FIG. 9 is a front view of the armoire and FIG. 10 is a partial front view of the armoire of FIG. 9. This type of dresser is also constructed in two sections, upper 65 and lower 66, with the former bolted onto the latter. The lower section 66 contains two drawers 67 for storing clothing and/or other articles and an open shelf 68 for storing electronic equipment, as in the prior embodiment. The armoire also contains the lift structure of FIGS. 6A-6D and the lift storage cavity in the lower section to house the lift structure of FIGS. 3 and 4, and the rear mounting on which to mount the television (or other object) of FIG. 5, and the remote control electronics of FIG. 8, essentially the same as in the preceding embodiment, and need not be again illustrated or further described. The front of section 65 of the armoire includes a panel 70. The panel covers a large rectangular window formed in the upper section 35 and is essentially opaque. Panel 70 is decorated to appear as a pair of conventional hinged armoire doors each of which contains a wooden panel in which the wood is properly finished and matches the wood of the drawers in the lower section 66. As one appreciates, a plasma television is concealed behind that panel.

When one wishes to view the television, one directs the remote control at the front of the armoire and at the open shelf 68 where the infra-red pick up for the lift mechanism may be positioned and operates the "down" button. Panel 70 then moves down and into the bottom section 66 of the armoire. Reference is made to FIG. 10, which illustrates the panel 70 in transition, moving to the down position and exposing to view the flat plasma television display 28. Using the remote control for the television, the television set is turned "on," and the user selects the channel the consumer desires to watch.

As one appreciates, the invention is a combination that crosses two industries, the furniture industry and at least one other industry, such as the television industry. Manufacturers of LCD and plasma televisions have been presenting and selling their plasma and LCD type TV sets in picture-frame like cabinets, avoiding the fine furniture cabinets and more complex furniture of the past to keep costs down. Furniture manufacturers of course are not equipped to inventory flat screen televisions in furniture or to maintain that equipment. Those manufacturers also wish to keep costs down. Since the present invention includes a quality cabinet with complex cabinetry features to camouflage a flat screen television, the woodwork, that is, the cabinet portion of the invention, as a practical matter, will be marketed and sold by a furniture manufacture without a television, but with instructions for installation of the television. With those instructions, the personnel of the TV store are able to install the flat screen television in the furniture, and, ideally, the customer may also be able to do so on his or her own, should the TV store be unwilling to assist citing insurance reasons.

Alternatively, even without a television set being installed, the invention possesses utility. That is, with the mirror (or mirror-less panel) in the down position, but without a television in place in the furniture, one is able to see through the window in the hutch and view the mount for the television, namely the mounting board in the preferred embodiment that spans the window in the hutch. With the mirror (or mirror-less panel) raised to the upper limit filling the window in the hutch, that mount is concealed behind the mirror and cannot be viewed from the front of the furniture. In that sense, the new dresser or armoire (aka camouflaged display stand) serves to hide the mounting board. Although the latter structure is also believed to be novel, as a practical matter, no one would likely sell or purchase such furniture in order to camouflage a television mounting board.

But there could be other applications for the new mirrored dresser that might not seem so trivial. As example, if one possessed a valuable oil painting, such as a Van Gough or Renoir, that one wished for any reason to keep from view by visitors to one's abode, and if that painting was of an appropriate size to fit on the mounting board behind the movable mirror or panel, then only when the mirror or panel is placed in the down position could the oil painting be viewed. In that sense the mirrored dresser or mirror-less armoire camouflages, not a flat screen TV stand, but an oil painting stand. Likewise, if one has a diamond necklace attached to a velvet covered panel that one wishes to admire each evening in the privacy of one's bedroom or family room to recall fond memories of an earlier time, the velvet covered panel carrying the necklace may be mounted to the rear mount. Then the view of that object is blocked from view (from: the front) by either the mirror or panel, whichever is used, when one doesn't wish to admire the object. However, once one is certain that there are no unwanted visitors in the room, the remote control is operated to lower the respective mirror or panel and the necklace may be admired.

It is believed that the foregoing description of the preferred embodiments of the invention is sufficient in detail to enable one skilled in the art to make and use the invention without undue experimentation. However, it is expressly understood that the detail of the elements comprising the embodiment presented for the foregoing purpose is not intended to limit the scope of the invention in any way, in as much as equivalents to those elements and other modifications thereof, all of which come within the scope of the invention, will become apparent to those skilled in the art upon reading this specification. Thus, the invention is to be broadly construed within the full scope of the appended claims.

What is claimed is:

1. The invention comprising in combination:
   a mirrored dresser;
   said mirrored dresser comprising:
      a first dresser section and
      a second dresser section;
   said first dresser section including a top surface and a plurality of drawers underlying said top surface;
   said second dresser section including a hutch portion attached to said first dresser section and positioned on top of and overlying a rear portion of said top surface of said first dresser section;
   said hutch portion including an open front side and right and left side walls respectively located on opposite sides of said open front side;
   a mirror, said mirror having a planar reflecting surface;
   said first dresser section including a vertical channel extending from said top surface to a predetermined depth;
   an electrical lift mounted within said vertical channel for vertically positioning said mirror;
   said electrical lift including a stationary section, a vertically positioned section and an electric motor for driving said vertically positioned section upwardly or downwardly in response to a user-supplied control signal;
   said hutch being positioned on said top surface of said first dresser section with a front portion of said hutch being located overlying said vertical channel to receive said mirror when said mirror is raised to said upper limit to fill said open front side of said hutch and block from view anything located behind said mirror.

2. The combination as defined in claim 1, further comprising:
   a mount for a flat screen television, said mount being attached to the rear of said hutch portion and spanning the rear of said right and left side walls of said hutch;
   said mount being concealed by said mirror when said mirror is raised to said upper limit to fill said open front side of said hutch and block from view anything located behind said mirror, but to expose said mount when said mirror is lowered from said upper limit.

3. The combination as defined in claim 1, further comprising:
   a mount for a plasma television display, said mount being attached to the rear of said hutch portion and extending across the rear of said right and left side walls of said hutch;
   said mount being revealed when said mirror is lowered to said lower limit opening said front side of said hutch and exposing to view said mount for said plasma television display, if a plasma television is not installed, or exposing to view said plasma television display, if a plasma television is installed.

4. The combination as defined in claim 1, wherein said hutch portion further includes a guide rail on each of the left and right side of said open front window for receiving and guiding the right and left sides of said mirror during vertical movement of said mirror.

5. The combination as defined in claim 3, wherein said hutch portion further includes a guide rail on each of the left and right side of said open front window for receiving and guiding the right and left sides of said mirror during vertical movement of said mirror.

6. The combination as defined in claim 1, wherein said electrical lift further includes:
   a wireless receiver.

7. The combination as defined in claim 4, further including a battery powered wireless remote controller for providing commands to said wireless receiver.

8. The combination as defined in claim 2, further comprising: a flat screen television display, said flat screen television display being attached to said mount.

9. The combination as defined in claim 3, further comprising: a plasma television display, said plasma television display being attached to said mount.

10. The combination as defined in claim 2, wherein said flat screen television display comprises an LCD television display and wherein said LCD television display is attached to said mount.

11. A combined mirrored dresser and television stand, comprising:
   a dresser;
   a mirror for said dresser, said mirror having a planar reflecting surface and having a predetermined height and width;
   a plasma or liquid crystal flat screen television display;
   said dresser comprising:
   a first dresser section and a second dresser section;
   said first dresser section including at least a top surface and a plurality of drawers underlying said top surface;
   said second dresser section including at least a hutch portion;
   said hutch portion being attached to said first dresser section and positioned on top of and overlying a rear portion of said top surface of said first dresser section;
   said hutch portion including an open front side and right and left side walls respectively located on opposite sides of said open front side;

an electrical lift, said first dresser section including a vertical channel extending from said top surface to a predetermined depth and sufficient in size to receive at least both said electrical lift and said mirror;

said electrical lift being mounted within said vertical channel for vertically positioning said mirror;

said electrical lift including a stationary section, a vertically positioned section and electric motor means for driving said vertically positioned section;

said mirror being mounted to said vertically positioned section of said electrical lift;

said electrical lift being responsive to a user-supplied control signal for driving said vertically positioned section to a vertical position at which the top edge of said mirror lies at a predetermined upper limit and downwardly to a vertical position in which said top edge of said mirror lies at a predetermined lower limit, said lower limit being at least below said top surface of said first dresser section;

a mount for at least said flat screen television display, said mount being attached to the rear of said hutch portion and extending across the rear of said right and left side walls of said hutch;

said mount being concealed by said mirror when said mirror is raised to said upper limit to fill said open front side of said hutch and block from view anything located behind said mirror; and when said mirror is lowered, including lowered to said lower limit, opening said front side of said hutch for exposing said mount to view from the front side of said hutch, if a flat screen television is not installed to said mount, or exposing to view from the front side of said hutch said flat screen television display, if a flat screen television is installed to said mount;

said hutch being positioned on said top surface of said first dresser section with a front portion of said hutch being located overlying said vertical channel for receiving said mirror when said mirror is raised by said electrical lift to said upper limit to fill said open front side of said hutch and block from view any flat screen television display located behind said mirror;

said hutch further including a guide track on each of the left side borders of said window, said guide tracks being positioned over the respective right and left sides of said vertical channel to receive and guide the side edges of said mirror during vertical movement of said mirror;

said electrical lift further including:

a wireless receiver for receiving commands from a wireless controller commanding said electrical lift to either raise said mirror, lower said mirror or halt vertical movement of said mirror;

a battery powered wireless remote controller having selectively operable switches for transmitting command signals to said wireless receiver for alternatively either raising said mirror, lowering said mirror or halting vertical movement of said mirror; and a manual switch box including manually operated switch means for commanding said electrical lift to either raise said mirror, lower said mirror or halt vertical movement of said mirror in lieu of commands from said wireless receiver.

12. A camouflaged display stand, comprising:

a dresser;

said dresser including a base, said base including drawers for storage of clothing, and a hutch that overlies said base;

said hutch comprising a frame of a predetermined width, said frame including a frame member at each of the right and left hand sides of said frame and defining a large window opening on the front side;

a mounting structure located in said hutch for mounting an article to be displayed in a stationary position;

an opaque panel for filling said large opening in said hutch to normally block a view of said mounting structure or any article mounted to said mounting structure from the front side of said hutch; and an electrical elevator platform for moving said mirror or opaque panel from said position filling said large opening in said hutch to a vertically lower position removed from said large opening to unblock view of at least said article and vice-versa in response to control signals.

13. The camouflaged display stand as defined in claim 12, wherein said opaque panel comprises a mirror.

14. The camouflaged display stand as defined in claim 13, further comprising: a manually operated control for supplying selected control signals to said electrical elevator platform.

15. The camouflaged display stand as defined in claim 14, wherein said object to be displayed comprises: a flat screen television display.

16. The camouflaged display stand as defined in claim 15, wherein said flat screen television display comprises a plasma television display.

17. The camouflaged display stand as defined in claim 15, wherein said flat screen television display comprises a liquid crystal television display.

18. The camouflaged display stand as defined in claim 12, wherein said mounting structure further comprises: a rectangular wood panel, and said wood panel being positioned behind said large opening on said front side.

19. The camouflaged display stand as defined in claim 14, wherein said electrical elevator platform includes: a wireless receiver; and wherein said manually operated control comprises: a wireless controller for communicating commands to said wireless receiver.

20. The camouflaged display stand as defined in claim 12, wherein said window opening includes right and left sides; each of said right and left side including a guide track for receiving the respective right and left side of said opaque panel to guide vertical movement of said opaque panel.

21. The camouflaged display stand as defined in claim 20, wherein said dresser includes a vertically extending channel extending from the top of said dresser downward; wherein said hutch overlies said channel; wherein said vertically lower position to which said opaque panel may be lowered by said platform is inside said channel, whereby said opaque panel is concealed when placed in said vertically lower position.

22. The camouflaged display stand as defined in claim 12, where said opaque panel includes a front surface, said front surface being decorated to produce the appearance of a pair of hinged doors located in a side-by-side relationship whereby to simulate the doors of an armoire.

* * * * *